G. S. HEATH.
THROTTLE AND HORN CONTROL APPARATUS.
APPLICATION FILED AUG. 4, 1922.

1,430,229.

Patented Sept. 26, 1922.
2 SHEETS—SHEET 1.

Witness:
G. Burkhardt.

Inventor:
George S Heath,
By Samuel N. Pond
atty

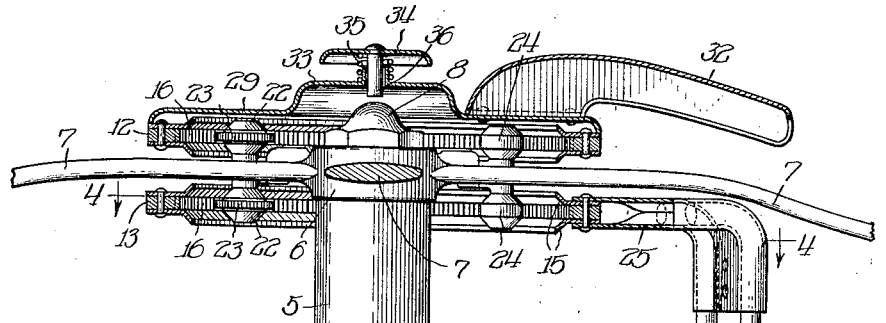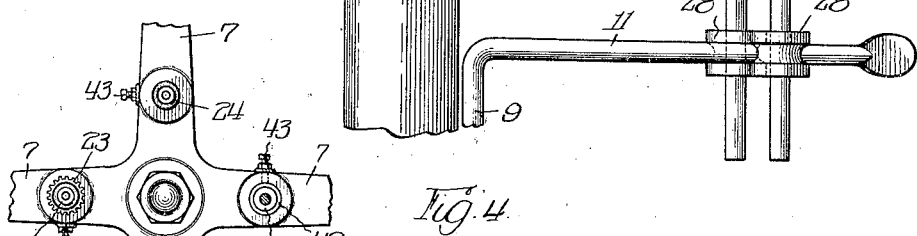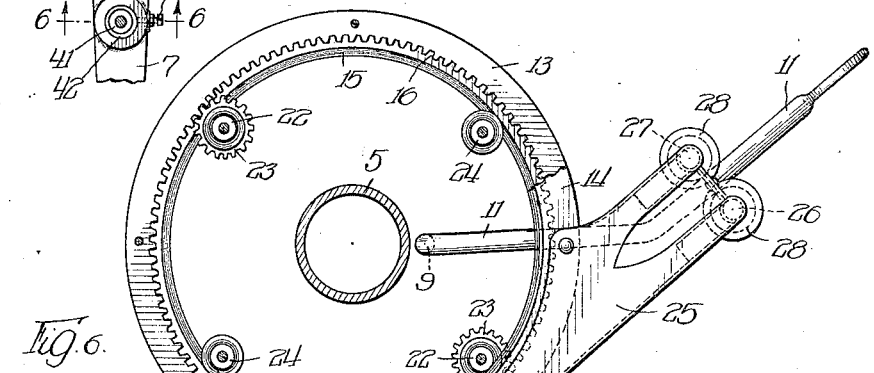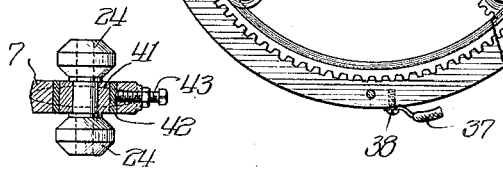

Patented Sept. 26, 1922.

1,430,229

UNITED STATES PATENT OFFICE.

GEORGE S. HEATH, OF CHICAGO, ILLINOIS.

THROTTLE AND HORN CONTROL APPARATUS.

Application filed August 4, 1922. Serial No. 579,563.

*To all whom it may concern:*

Be it known that I, GEORGE S. HEATH, a citizen of the United States, residing at Chicago, in the county of Cook and State of Illinois, have invented certain new and useful Improvements in Throttle and Horn Control Apparatus, of which the following is a specification.

This invention pertains in general to automobiles, and has more particular reference to a control for the throttle and also for the horn, and which are so located as to be readily accessible to the driver.

Some automobiles as marketed, and especially a popular and well-known make of car, have the throttle lever located beneath the steering wheel, the shaft or rod in this instance, from which the lever projects, being disposed outside the steering post.

The throttle lever, however, is in an unhandy and inaccessible position, and its manipulation usually requires the removal from the wheel of the driver's hand.

The more expansive makes of cars have the throttle lever and horn button both located above the steering wheel in a convenient and accessible position, but in order to do this the shaft or rod upon which the throttle lever is mounted extends through the center of the steering post instead of being disposed alongside thereof, as in the cars previously mentioned.

The primary purpose of my present invention is to provide an attachment for cars in which the throttle lever is located beneath the steering wheel, which will enable the driver to manipulate the throttle from a convenient location above and near the center of the steering wheel.

Another purpose of the invention is to provide a horn control button which will also be located in a convenient and readily accessible position above the steering wheel and preferably centrally thereof.

A further object is to provide an attachment of the character indicated which in one of its preferred forms may be quickly and easily attached to cars already in use and without change or modification of the steering wheel or throttle mechanism with which the car is customarily equipped.

Still another object is to provide an apparatus which will be simple in construction, economical to manufacture, one which will be strong and durable, and which will present an attractive appearance in addition to being serviceable and easy to manipulate.

Other advantageous features of this invention should be readily apparent as the same becomes better understood by reference to the following description when considered in connection with the accompanying drawings:

Referring to the drawings:

Fig. 1 is a plan view of the central portion of a steering wheel equipped with my invention;

Figs. 2 and 3 are sectional views on the lines 2—2 and 3—3 respectively, of Fig. 1;

Fig. 4 is a sectional view on the line 4—4 of Fig. 3;

Fig. 5 is a fragmentary plan view of a modification of the invention; and

Fig. 6 is a sectional detail on the line 6—6 of Fig. 5.

Figure 1:
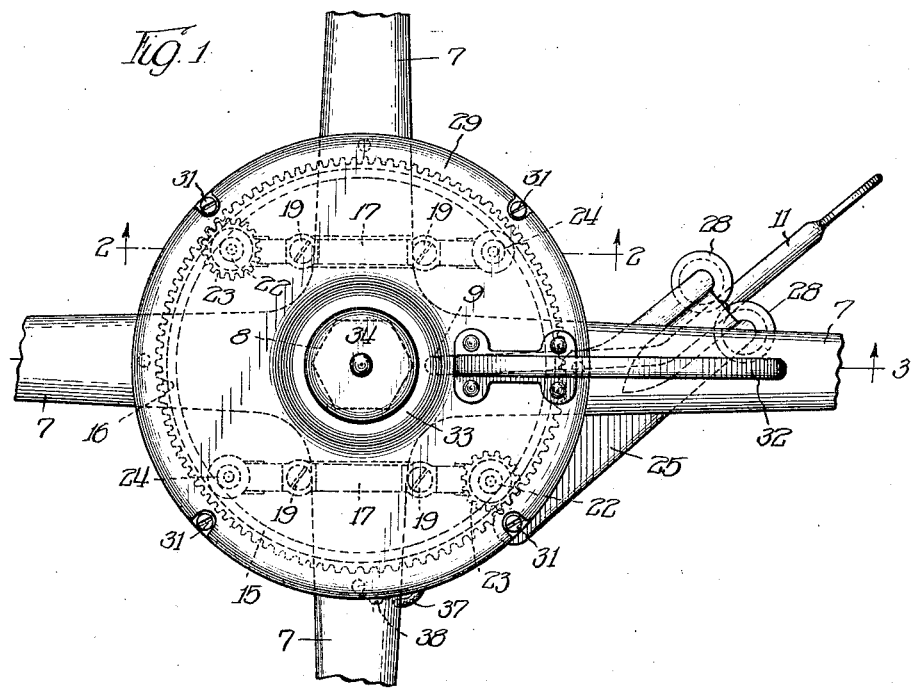

Referring now to the drawings more in detail, reference character 5 indicates generally a steering post of any preferred construction, upon which is mounted the hub 6 of a steering wheel, the rim of which (not shown) is connected to the hub by a plurality of radial spokes 7. The wheel is fastened to the top of the post, usually by a cap screw 8, and the throttle rod or shaft 9 extends parallel with and alongside the post 5 to a point somewhat beneath the steering wheel where it is provided with a laterally projecting throttle lever 11. The structure thus far described is standard construction and it is with the aim of enabling the manipulation of the throttle lever 11 from a point above the steering wheel that my present invention was devised.

Figure 2:
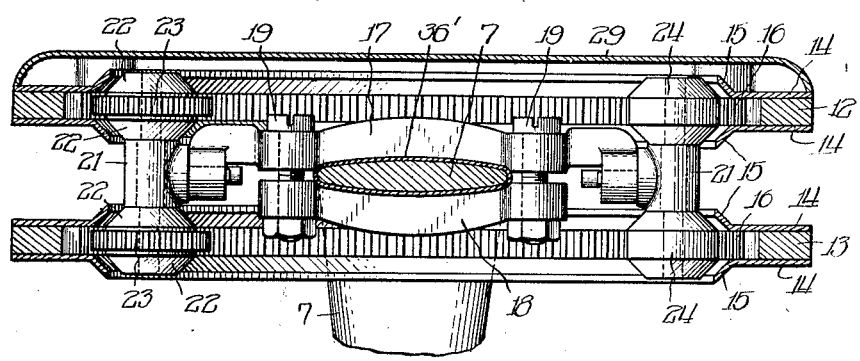

The apparatus of my invention comprises a pair of internal gear rings indicated by 12 and 13 respectively, which, when the apparatus is assembled, are disposed respectively above and beneath the spokes of the steering wheel. Each ring has secured thereto a pair of flanged rings 14, the flanges 15 of which extend inwardly at opposite sides of the teeth 16 of the gear rings and are flared apart, as will be apparent from Figs. 2 and 3, to provide a flaring inwardly opening guide or raceway by which the rings are supported, as will be later explained.

Upon two of the oppositely disposed spokes of the steering wheel, I mount supporting brackets, each of which comprises an upper member 17, overlying the spoke and a companion member 18 disposed beneath the spoke, the two members being secured together by bolts 19 whereby they are securely clamped to the spoke. The outer end of each member 17 carries a vertically disposed bearing 21 in which is journaled a vertically disposed shaft having fixedly attached to its ends projecting beyond the bearing a pair of tapered rollers 22. These rollers are adapted to fit in the raceways formed by the flanges 15 so that the two gear rings are rotatably supported by these rollers above and beneath the spokes of the steering wheel.

The rollers, at one end at least of each bracket member, are provided with gear teeth 23 adapted to mesh with the internal teeth 16 of their respective rings, and while all of the rollers may be thus equipped, I have found that one set of gear rollers will operate satisfactorily but that two sets as shown are preferable, in which case the other two sets of rollers, indicated by reference character 24, may be plain, instead of toothed, serving therefore merely as supporting elements for the respective gear rings, while the other sets serve not only as supporting elements, but also provide a mechanical connection between the upper and lower rings so that the rotative movements of one ring will be transmitted to the other.

The lower ring 13 is provided at one side with an obliquely projecting bifurcated arm 25 which is equipped with a pair of downwardly extending spaced fingers 26 and 27 adapted to straddle the throttle lever 11. Upon these fingers there is slidably mounted a pair of grooved rollers 28 which embrace the throttle lever. It will be apparent therefore that any rotative movement of the lower gear ring will impart a similar movement to the throttle lever 11, but since this lever is mounted eccentrically with respect to said lower ring, a relative movement between this lever and the fingers in a direction longitudinally of the lever 11 will necessarily take place, which movement is permitted without undue friction as the result of the provision of the rollers 28.

The upper ring member and the top of the central portion of the wheel are covered by a cap plate 29 secured at intervals by screws 31 to the upper ring, and from this cap plate there projects in a radial direction, an operating lever or handle 32 by means of which the ring may be rotated.

Assuming that adjustment of the throttle is desired, the lever 32 may be actuated to rotate the upper ring in a clockwise or counter-clockwise direction, as desired. This movement causes a rotation of the upper gear rollers 23 which mesh with the teeth of the upper ring, and since both these rollers and the lower rollers are fixed on the same shaft, the rotary movements of the upper ring will be transmitted directly to the lower ring which carries the fingers 26 and 27, thereby swinging the throttle lever 11 to effect the desired adjustment of the throttle. It will be manifest that these movements of the gear rings do not appreciably affect the steering wheel, since only a rotary movement of the gear rollers about their own axes is imparted by rotative movement of the rings. Furthermore, manipulation of the throttle lever control or the maintenance of the same in adjusted position is not effected by steering movements of the steering wheel for the reason that when this wheel is rotated, the gear members 23, by reason of the fact that their friction of rotation is less than the resistance to movement of the lower ring, will simply revolve idly and travel with the steering wheel without transmitting any movement to the gear rings.

The central portion of the cap plate 29 is preferably elevated, as indicated by reference character 33 in Fig. 3, and upon this elevated portion there is mounted a push button 34 which is normally held in elevated position by a spring 35 and carries a contact member 36 adapted to be depressed against the force of the spring into engagement with the top of the cap nut 8, thereby closing the circuit which actuates the horn. In order that the circuit may be thus established, the steering wheel spokes are insulated from the gear rings by suitable insulation 36' interposed between the spokes and the opposed clamping members 17 and 18. The circuit wire 37 connected in series with the horn and the source of electrical energy is attached to the lower gear ring as indicated at 38, and in order to prevent the circuit from grounding through the throttle lever, the rollers 28 are made of suitable insulating material, such as rubber or other well-known insulating compounds. The steering post 5, of course, is grounded and when the control button is depressed bringing the contact plunger 36 into contact with the cap nut 8, the circuit is closed from the wire 37, the gear rings, their connecting gears and shafts, the cap plate 29, the push button and thence through the steering post to ground.

In the modified form of the invention shown in Figs. 5 and 6, the supporting rollers 24 and gear wheels 23, instead of being carried by brackets attached to the wheel spokes 7, are mounted directly in the spokes. The spokes in this instance are provided with vertically disposed bearing openings in which are mounted bearing sleeves 41 surrounded by collars 42 of insulating material to insulate the rollers from the wheel. While the bearing sleeves may be secured in position in any approved manner, I have shown for illustrative purposes, set screws 43 adapted to clamp the bearing sleeves in position. For convenience in assembly the bearing openings through the bearing rings may be positioned eccentrically, thereby affording provision for adjustment of the rollers relatively to the surrounding rings.

While the throttle and horn control may be embodied in one apparatus as illustrated, the throttle operating mechanism may be employed without the horn control button, if desired, and similarly the horn control feature may be utilized alone if preferred in which instance the rings will be plain instead of provided with gear teeth and will be supported by the rollers, the rings in this instance serving merely as an electrical conductor for conveying current from a point beneath the wheel to the horn button located above the wheel.

It should be manifest from the foregoing that I have provided an apparatus which positions the horn control button and the throttle control mechanism, or either, in convenient and accessible position above the steering wheel, and that they may both be manipulated, as desired, without interference with the steering movements of the wheel and without being interfered with by movements of the wheel. The apparatus is simple in construction, economical to manufacture and easy to assemble and can therefore be quickly applied by unskilled labor without disturbing any of the normal equipment of the car with the single exception of changing the wiring of the horn circuit.

It is believed that the construction, operation, and many of the inherent advantages of this invention will be understood and appreciated without further description, and it should be manifest that the structural details illustrated and described are capable of wide variation and modification without departing from the essence of the invention as defined in the following claims.

I claim:

1. The combination with a steering wheel, and a throttle lever disposed beneath said wheel and outside the steering post, of a manually operable device above the wheel, and a connection between said device and said lever for transmitting movement of the device to said lever without affecting movements of said wheel.

2. The combination with a steering wheel and post, of a manually operable device above said wheel, a throttle actuating device below said wheel and outside said post, and an operative connection between said devices extending through said wheel outside said post, whereby the throttle may be actuated from above said wheel without interference with the wheel movements.

3. The combination with a steering wheel, a steering post and throttle lever beneath said wheel and outside said post, of means operable from above said wheel for manipulating said throttle lever.

4. The combination of a steering wheel, a steering post, a throttle lever beneath said wheel, and means rotatable concentrically with the wheel and operable from above the wheel whereby the position of said throttle lever may be adjusted.

5. In an apparatus of the character described, the combination of a pair of gear rings adapted to be disposed respectively above and beneath a steering wheel, throttle lever actuated means carried by the lower ring, means whereby said rings are supported from said wheel, and means for transmitting rotative movements of one of said rings to the other of said rings.

6. In an apparatus of the character described, the combination of a pair of internal gear rings, means for rotatably supporting said rings respectively above and beneath a steering wheel, means whereby the upper ring may be rotated, means for transmitting movements of said upper ring to said lower ring, and throttle lever actuating means carried by said lower ring.

7. In an apparatus of the character described, the combination of a pair of gear rings provided with internal teeth and with inwardly opening flaring guideways, tapered rollers adapted to engage in said guideways whereby the rings are supported, means for mounting said rollers upon the spokes of a steering wheel, means including gears for connecting said rings, and throttle lever actuating means carried by one of said rings.

8. In an apparatus of the character described, the combination of an upper gear ring provided with a guideway and an operating handle, a lower gear ring provided with a guideway and throttle lever actuating means, ring supporting rollers adapted to engage in said guideways, and means for transmitting rotative movements from one of said rings to the other of said rings, said means including gear wheels secured together and meshing with the teeth of the respective rings.

9. In an apparatus of the character described, the combination of a plurality of tapered rollers adapted to be carried by a steering wheel above and beneath the plane of said steering wheel, ring gears provided with flared raceways adapted to engage said rollers and to be supported thereby above and beneath said wheel, gears rigidly connected together and adapted to mesh with the teeth of said gear rings respectively, throttle lever actuating means carried by the lower of said gear rings, and means whereby said upper gear rings may be rotated relatively to said wheel.

10. In an apparatus of the character described, the combination of a pair of gear rings, means adapted to be mounted upon a steering wheel for rotatably supporting said rings above and beneath said wheel respectively, a cap plate covering said upper ring and the central portion of said wheel, a circuit closing button mounted on said cap plate and adapted to make contact with a portion of the wheel, a handle also carried by said plate by which said upper ring is rotated, fingers carried by said lower ring, and insulating grooved rollers slidably mounted on said fingers and engaging the opposite sides of a throttle lever.

11. In an apparatus of the character described, the combination of a pair of gear rings, means for rotatably supporting said rings respectively above and beneath a steering wheel, means for electrically insulating said rings from said wheel, a horn control button carried by the upper ring and adapted to make electrical contact with said wheel, throttle lever actuating fingers carried by said lower ring in position to actuate a throttle lever beneath said wheel, and means for electrically insulating said fingers from said lever.

12. In an apparatus of the character described, the combination of a pair of rings adapted to be disposed respectively above and beneath a steering wheel, means for supporting said rings and establishing an electrical connection between the same, said rings being electrically insulated from said steering wheel, an electrical connection to the lower ring, and a circuit closer connected with the upper ring and adapted upon actuation to make electrical connection with the steering wheel.

13. In an apparatus of the character described, the combination of a pair of rings, means whereby said rings are supported respectively above and beneath a steering wheel, said rings being electrically connected together but insulated from said wheel, and means above the wheel whereby an electrical connection may be established between said rings and said wheel.

GEORGE S. HEATH.